(12) United States Patent
Montenguise et al.

(10) Patent No.: US 10,582,663 B2
(45) Date of Patent: Mar. 10, 2020

(54) CLEANING DEVICE FOR AN AGRICULTURAL MACHINE

(71) Applicant: CNH Industrial America LLC, New Holland, PA (US)

(72) Inventors: Justin Montenguise, Bettendorf, IA (US); Craig E. Murray, Davenport, IA (US); Nicholas Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 698 days.

(21) Appl. No.: 14/900,723

(22) PCT Filed: Jul. 2, 2014

(86) PCT No.: PCT/US2014/045244
§ 371 (c)(1),
(2) Date: Dec. 22, 2015

(87) PCT Pub. No.: WO2015/003055
PCT Pub. Date: Jan. 8, 2015

(65) Prior Publication Data
US 2016/0143224 A1    May 26, 2016

Related U.S. Application Data

(60) Provisional application No. 61/842,448, filed on Jul. 3, 2013.

(51) Int. Cl.
*A01F 12/30* (2006.01)
*A01D 75/00* (2006.01)
*A01D 41/12* (2006.01)
*A01D 101/00* (2006.01)

(52) U.S. Cl.
CPC ......... *A01D 75/00* (2013.01); *A01D 41/1243* (2013.01); *A01D 2101/00* (2013.01)

(58) Field of Classification Search
CPC . A01D 75/00; A01D 41/1243; A01D 2101/00
USPC .............................. 460/111; 56/320.1, 320.2
See application file for complete search history.

(56) References Cited

U.S. PATENT DOCUMENTS

| 2,957,295 A | * | 10/1960 | Brown | ................. A01D 34/003 56/13.4 |
| 3,396,518 A | * | 8/1968 | Johnson | ............... A01D 34/003 56/16.9 |
| 3,742,689 A | * | 7/1973 | Barows | .................. A01D 57/00 56/226 |

(Continued)

FOREIGN PATENT DOCUMENTS

DE    102005015228 A1    10/2006

*Primary Examiner* — Thomas B Will
*Assistant Examiner* — Mai T Nguyen
(74) *Attorney, Agent, or Firm* — Patrick M. Sheldrake; Peter K. Zacharias

(57) ABSTRACT

An agricultural machine includes: a base member; a leading edge coupled with the base member and configured for receiving a flow of a material; and an assembly coupled with the base member, the assembly including a device and at least one flexible wiper coupled with the device, the device being configured for rotating and thereby for rotating the at least one flexible wiper therewith, said at least one flexible wiper thereby being configured for cleaning the material from the leading edge.

14 Claims, 11 Drawing Sheets

(56) References Cited

U.S. PATENT DOCUMENTS

| | | | |
|---|---|---|---|
| 3,869,923 A | | 3/1975 | Doering |
| 4,183,201 A | | 1/1980 | Stahlecker |
| 4,238,866 A | | 12/1980 | Taylor |
| 4,364,221 A | * | 12/1982 | Wixom ................ A01D 34/685 56/13.6 |
| 4,442,979 A | | 4/1984 | Kuepper |
| 4,617,942 A | * | 10/1986 | Garner .................... A01F 12/40 460/112 |
| 4,892,504 A | * | 1/1990 | Scott ........................ A01F 12/40 239/666 |
| 5,042,242 A | * | 8/1991 | Evans ................... A01D 34/003 56/17.5 |
| 5,082,186 A | | 1/1992 | Bruns |
| 5,215,500 A | | 6/1993 | Kirby |
| 6,314,848 B2 | | 11/2001 | Morabit et al. |
| 6,406,368 B1 | * | 6/2002 | Cruson ............... A01D 41/1243 460/111 |
| 6,457,242 B1 | | 10/2002 | Fogle |
| 6,539,694 B2 | * | 4/2003 | Oxley ................... A01D 34/003 56/12.7 |
| 6,688,971 B2 | * | 2/2004 | Buermann ............. A01F 12/40 460/112 |
| 7,377,091 B2 | * | 5/2008 | Shelton ................ A01D 45/021 56/119 |
| 7,473,171 B1 | * | 1/2009 | Schwinn ............ A01D 41/1243 460/111 |
| 7,587,828 B2 | | 9/2009 | Legrand |
| 7,635,299 B2 | | 12/2009 | Murray et al. |
| 7,882,642 B2 | | 2/2011 | Proulx |
| 8,042,223 B2 | | 10/2011 | Freewalt |
| 8,621,835 B2 | * | 1/2014 | Bollig ................. A01D 45/021 56/119 |
| 2007/0204588 A1 | * | 9/2007 | Neece .................. A01D 45/021 56/119 |

\* cited by examiner

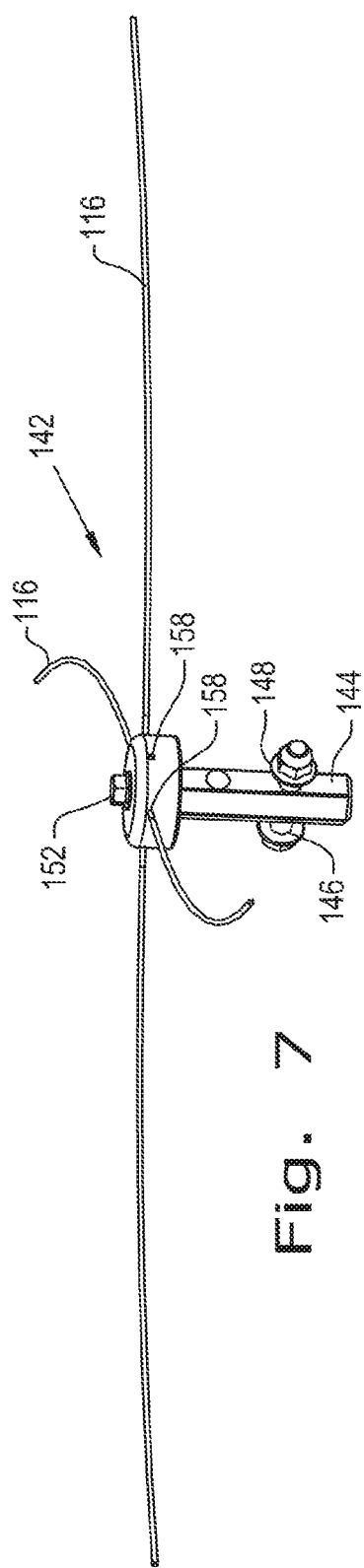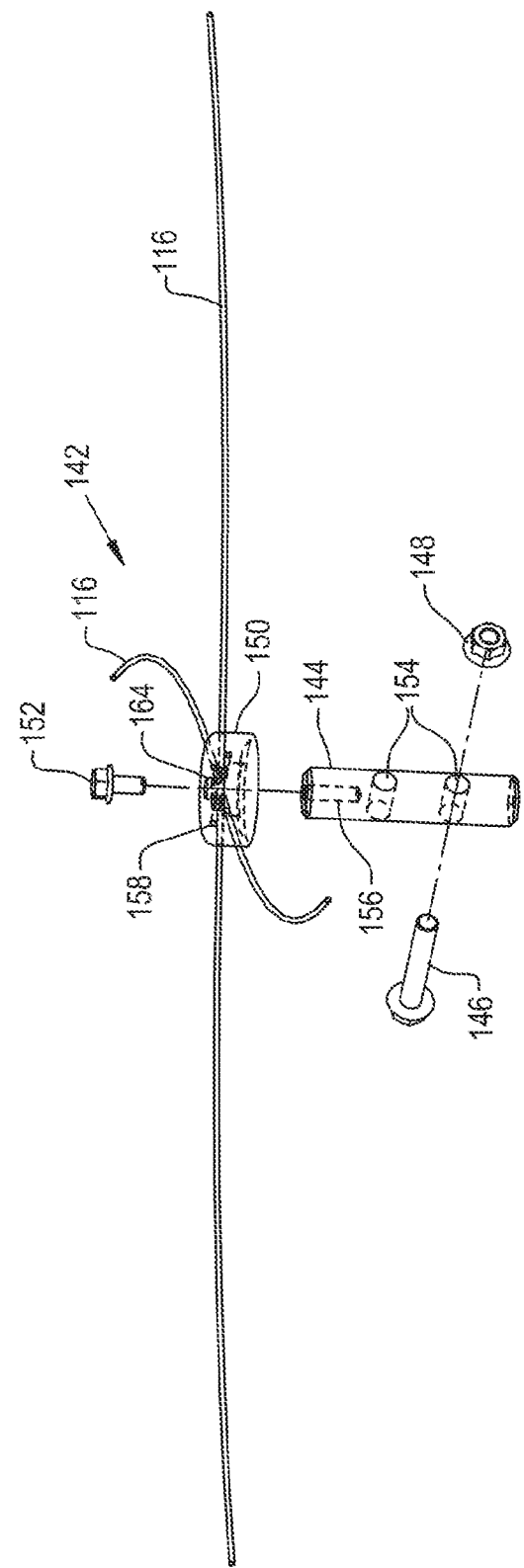

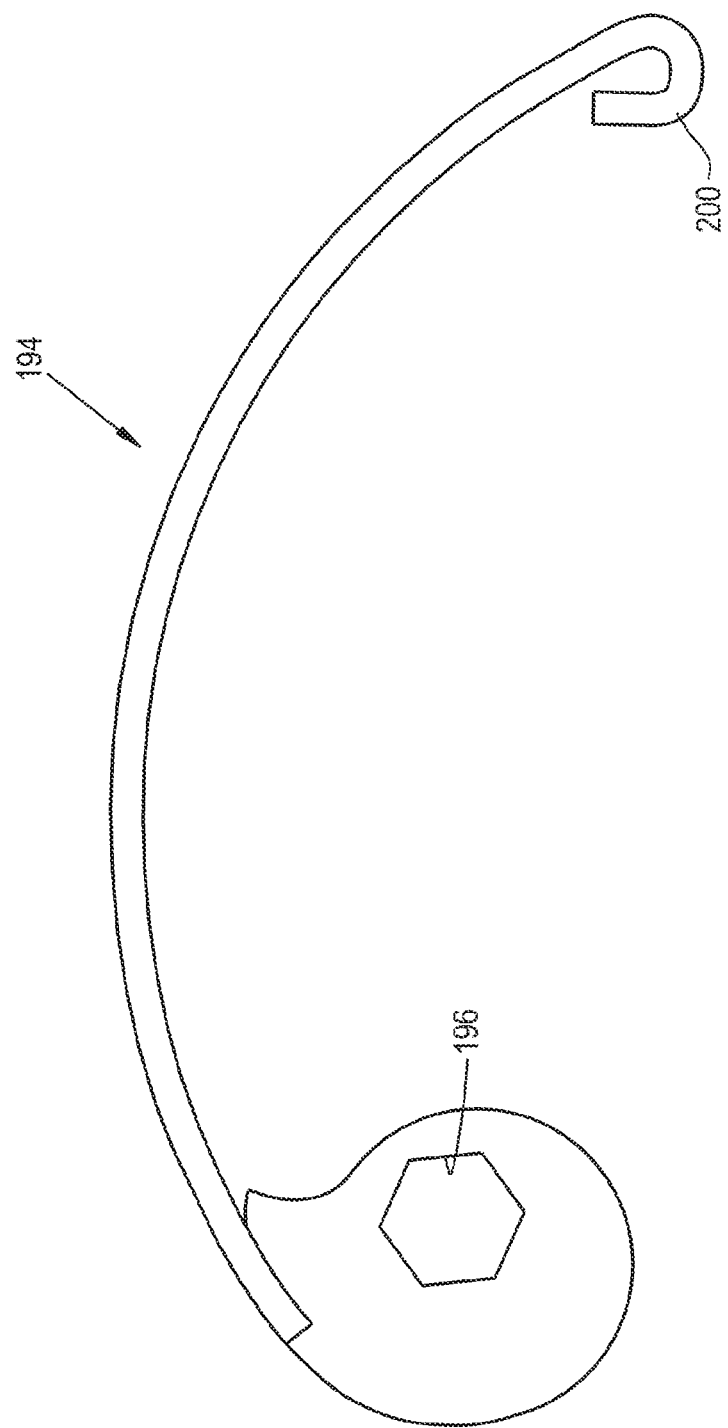

CLEANING DEVICE FOR AN AGRICULTURAL MACHINE

This application is the U.S. National Stage filing of International Application Serial No. PCT/US2014/045244, filed on Jul. 2, 2014 which claims priority to U.S. Provisional Application with Ser. No. 61/842,448, filed Jul. 3, 2013, each of which is hereby incorporated by reference in its entirety.

BACKGROUND OF THE INVENTION

1. Field of the Invention

The present invention relates to agricultural machines such as agricultural harvesters, and, more particularly, to cleaning devices used with such machines.

2. Description of the Related Art

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

Agricultural equipment, including combines, often create a stream of material. Such a flow of material can become clogged and can thereby obstruct the flow of the material through the combine.

What is needed in the art is a way to clean passageways within agricultural equipment so as to prevent flow-through material from becoming clogged, or to remove flow-through material which has become clogged, within such a passageway.

SUMMARY OF THE INVENTION

The present invention, in essence, provides a device for wiping an edge clean. The present invention provides at least one wiper to clean a passageway, such as a leading edge of a windrow chute for an agricultural machine, such as a combine, the wiper preventing flow-through material, such as straw, from becoming clogged or removing such flow-through material which has become clogged in the vicinity of the leading edge of the windrow chute.

The invention in one form is directed to an agricultural machine which includes: a base member; a leading edge coupled with the base member and configured for receiving a flow of a material; and an assembly coupled with the base member, the assembly including a device and at least one flexible wiper coupled with the device, the device being configured for rotating and thereby for rotating the at least one flexible wiper therewith, said at least one flexible wiper thereby being configured for cleaning the material from the leading edge.

The invention in another form is directed to an assembly for an agricultural machine including a leading edge configured for receiving a flow of a material, the assembly including: a device; and at least one flexible wiper coupled with the device, the device being configured for rotating and thereby for rotating the at least one flexible wiper therewith, the at least one flexible wiper thereby being configured for cleaning the material from the leading edge.

The invention in yet another form is directed to a method of using an agricultural machine, the method comprising the steps of: providing a base member, a leading edge coupled with the base member, and an assembly coupled with the base member and including a device and at least one flexible wiper coupled with the device; receiving, by the leading edge, a flow of a material; and rotating the device and thereby rotating the at least one flexible wiper therewith, the at least one flexible wiper thereby cleaning the material from the leading edge.

An advantage of the present invention is that it provides flexible wipers to the leading edge of a chute, such as a windrow chute, thereby providing a rolling edge, resulting in less machine plugging.

An advantage of the present invention is that, while being specifically applied to clean the leading edge of a windrow chute, the spinning cord can be adapted to clean any leading edge that may obstruct material flow and cause a plug in the combine or other equipment.

Yet another advantage of the present invention is that it can mitigate the problem of hair pinning. For example, when a non-active edge is introduced near the stream of material on the rear of a combine, hair pinning can be a major problem. Once hair pinning starts, it can result in plugging the rear end of the combine in a short period of time. Such a non-active edge on the rear of the combine can be a leading edge of a windrow chute, which can become clogged or plugged due to such hair pinning.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

FIG. 7 is a perspective view of the cap assembly of FIG. 4;

FIG. 8 is an exploded, perspective view of the cap assembly of FIG. 4;

FIG. 12 is a top view of the wiper shown on the spreader assembly of FIG. 11.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

The terms "grain," "straw," and "tailings" are used in this specification principally for convenience, but it is to be understood that these terms are not intended to be limiting. Thus "grain" refers to that part of the crop material which is threshed and separated from the discardable part of the crop material, which is referred to as non-grain crop material, MOG, or straw. Incompletely threshed crop material is referred to as "tailings". Also, the terms "forward," "rearward," "left," and "right," when used in connection with movable agricultural equipment such as an agricultural harvester and/or components thereof are usually determined with reference to the direction of forward operative travel of the harvester; but, again, they should not be construed as limiting. The terms "longitudinal" and "transverse" are determined with reference to the fore-and-aft direction of the agricultural harvester and are equally not to be construed as limiting.

Figure 1:
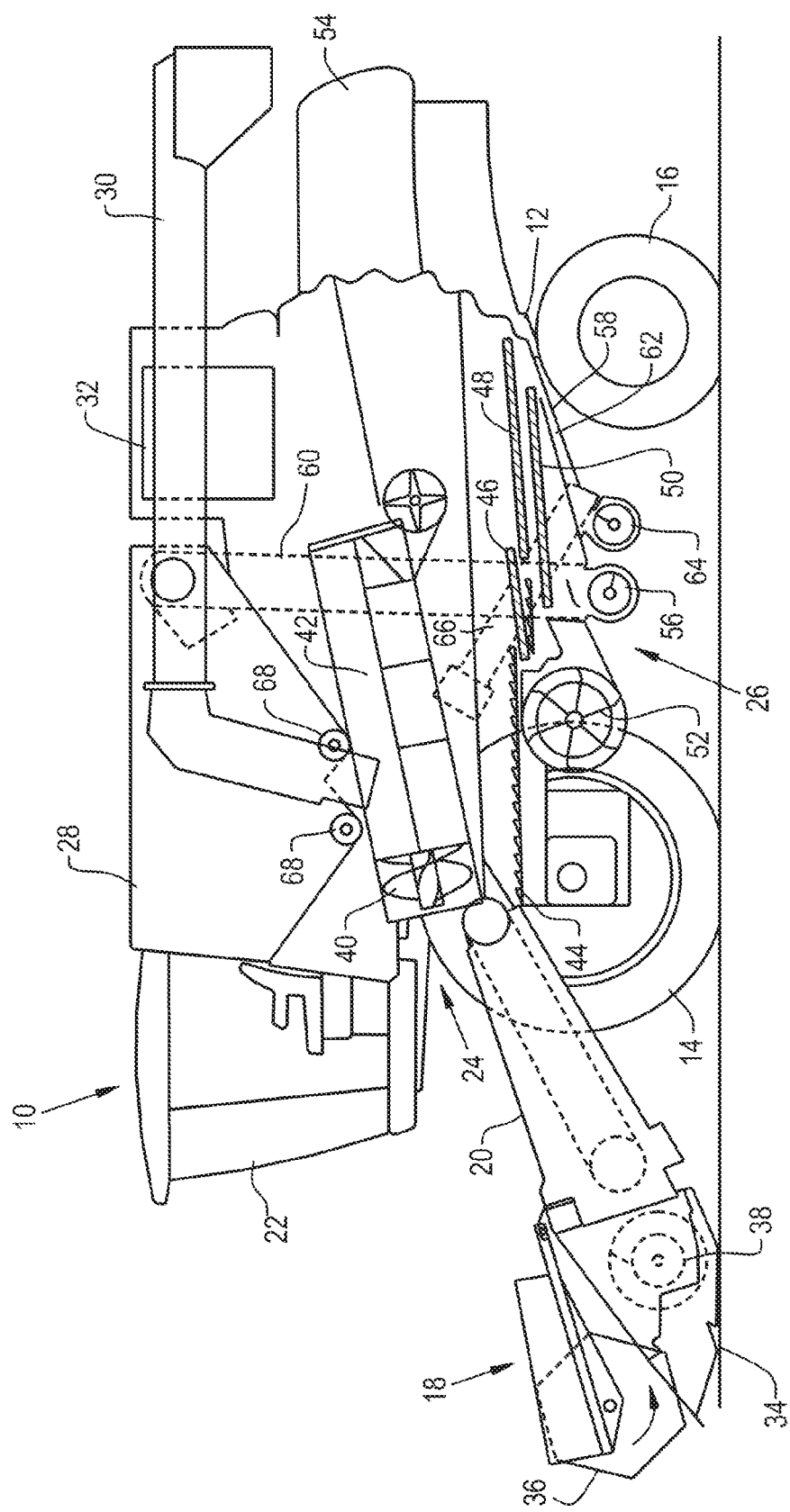
FIG. 1 is a side view schematically showing an agricultural machine.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, it is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24 and is selectively vertically movable using appropriate actuators, such as hydraulic cylinders (not shown).

Threshing and separating system 24 is of the axial-flow type and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 of cleaning system 26. Clean grain auger 56 conveys the clean grain laterally to a generally vertically arranged grain elevator 60 for transport to grain tank 28. Tailings from cleaning system 26 fall to a tailings auger trough 62 via bottom pan 58. The tailings are transported via tailings auger 64 and return auger 66 to the upstream end of cleaning system 26 for repeated cleaning action. A pair of grain tank augers 68 at the bottom of grain tank 28 conveys the clean grain laterally within grain tank 28 to unloading auger 30 for discharge from combine 10.

Figure 2:
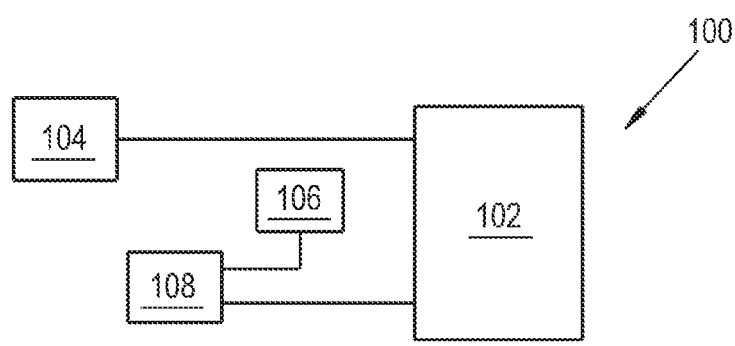
FIG. 2 is a schematic view showing the agricultural machine of FIG. 1.
Figure 3:
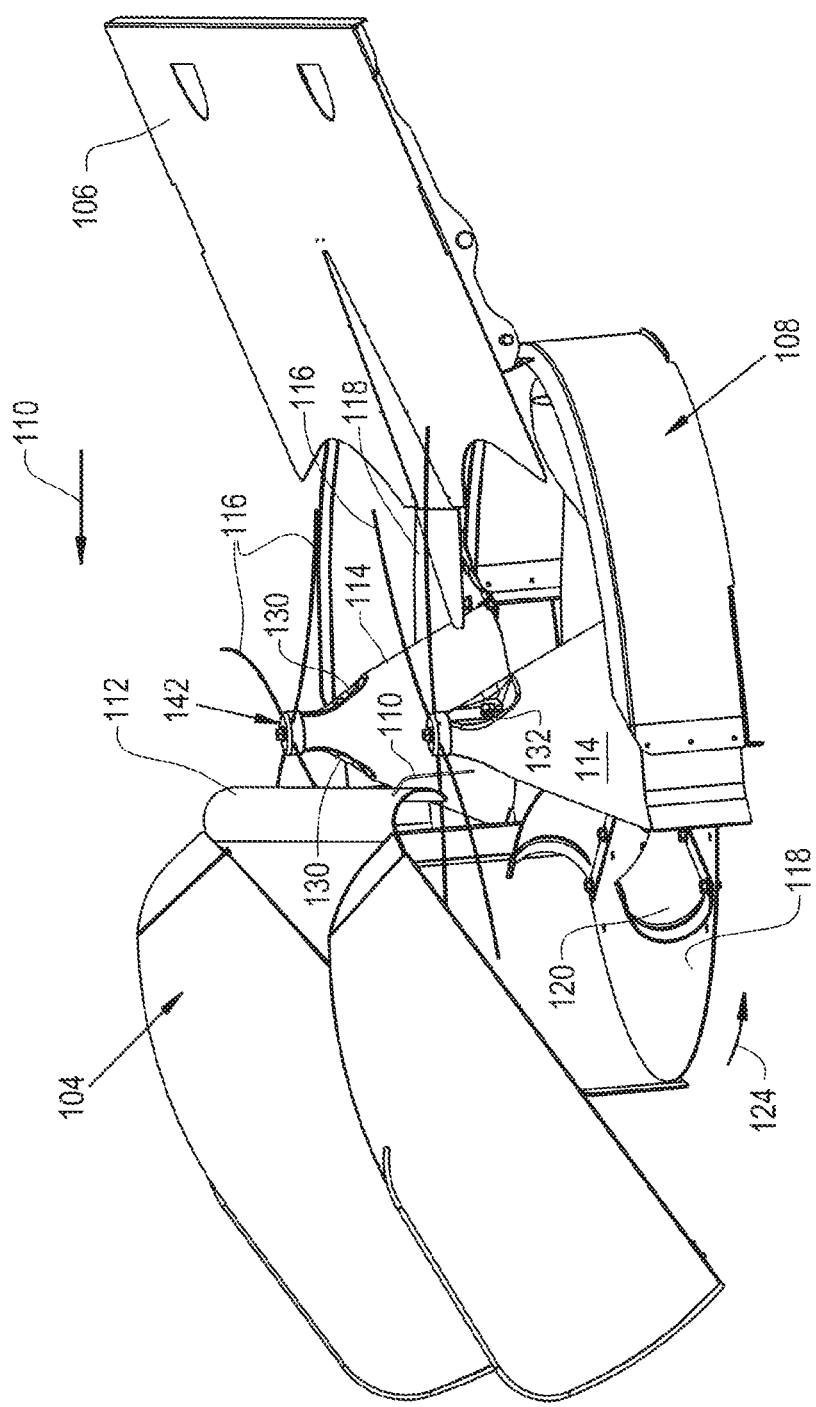
FIG. 3 is a perspective view of a windrow chute, a ramp, and a spreader assembly which can be attached to the rear of the agricultural machine of FIG. 1.
Figure 4:
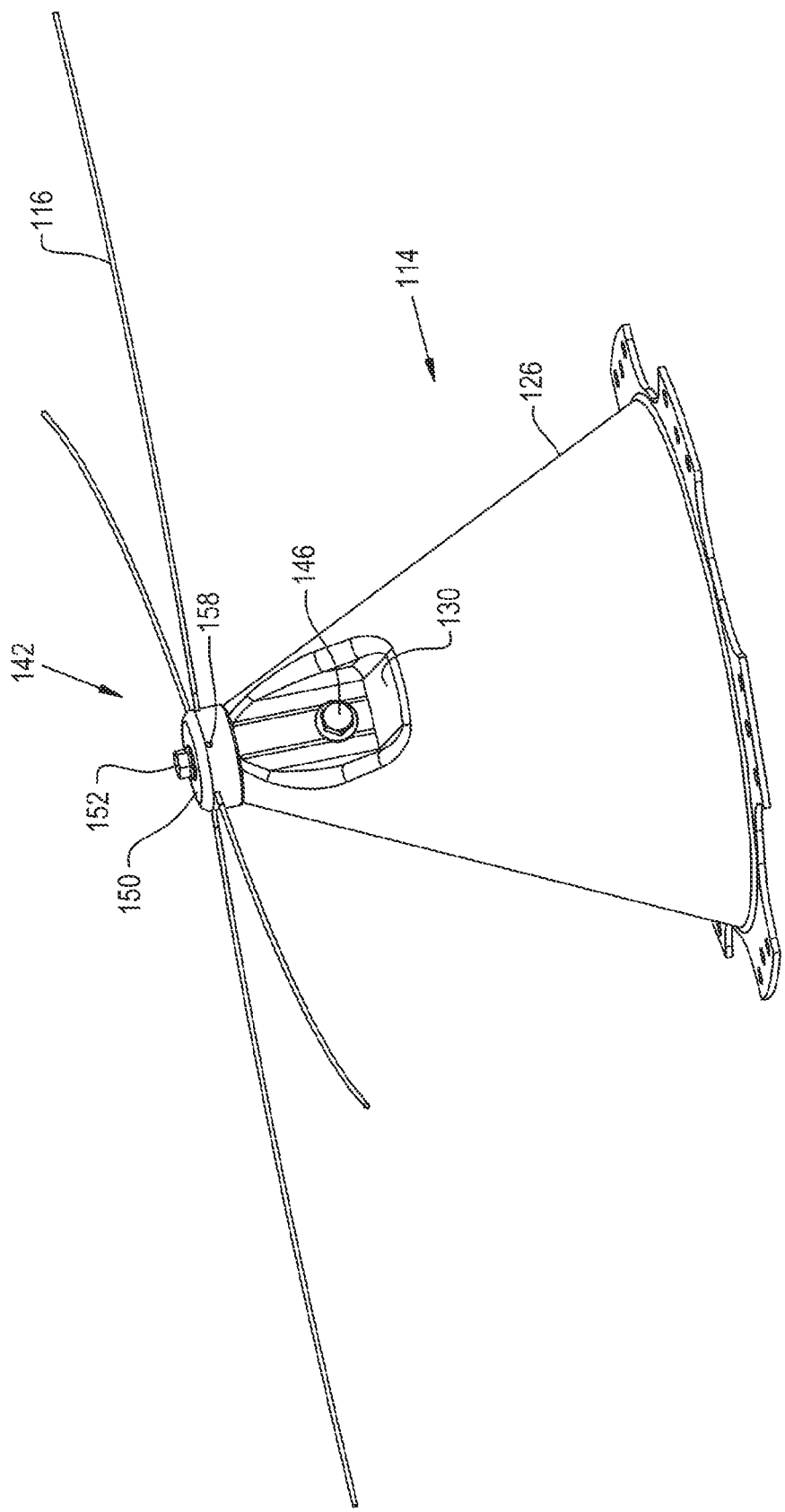
FIG. 4 is a perspective view of the spreader cone and cap assembly of the spreader assembly of FIG. 3.
Figure 5:
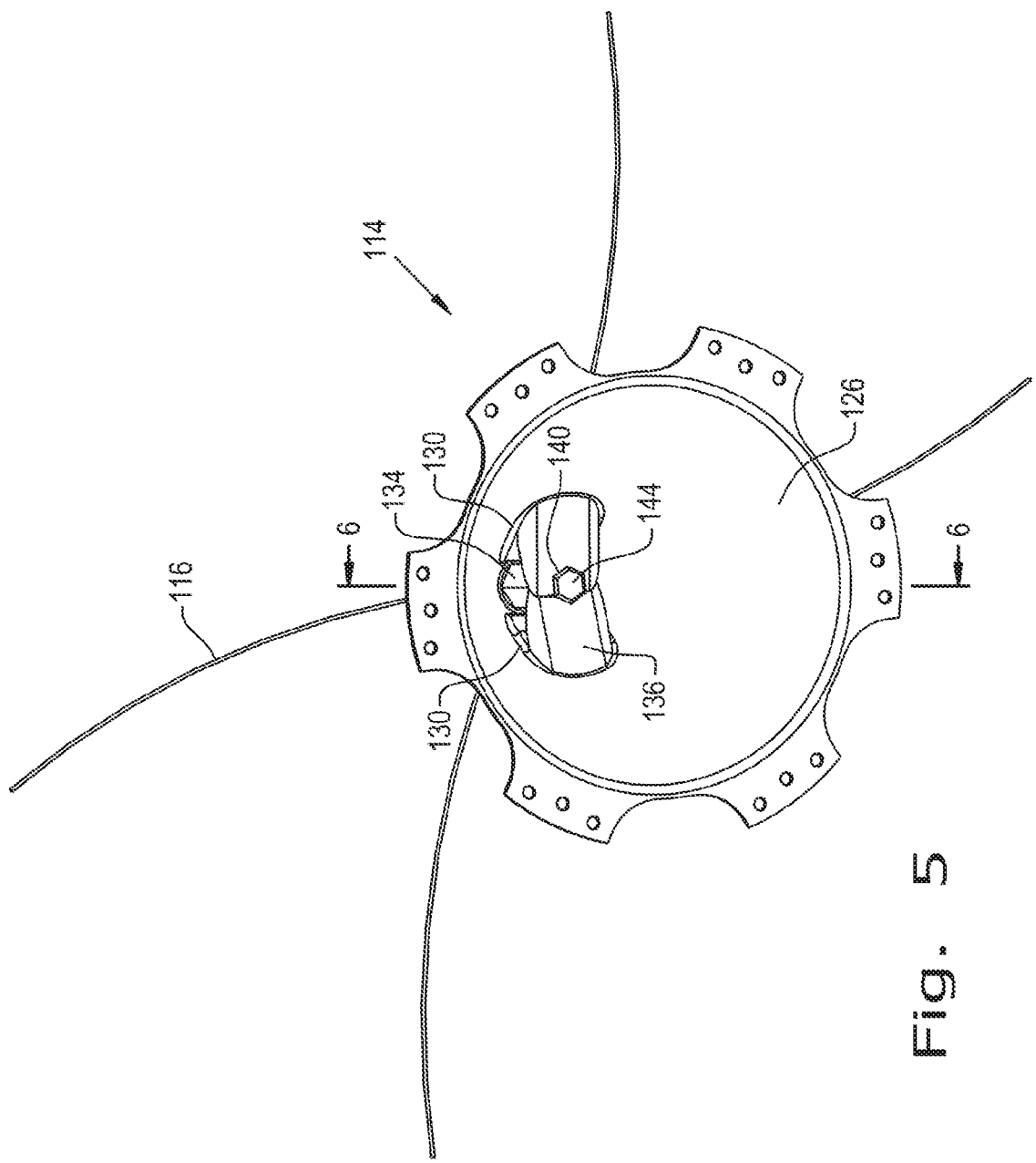
FIG. 5 is a bottom, perspective view of the spreader cone and cap assembly of FIG. 4.

According to an aspect of the present invention, and referring now to FIGS. 2 and 3, there is shown an agricultural machine 100 in the form of an agricultural harvester, which can be referred to as a combine, with portions broken away. While the drawings show agricultural harvester 100, it is understood that the present application can be applied to other forms of agricultural machines or equipment. Combine 100 includes a base member 102 such as a chassis 102. Combine further includes a windrow chute 104, a ramp 106, and an assembly 108. Windrow chute 104, ramp 106, and assembly 108 are each coupled (this term including direct and indirect connections) with chassis 102. In a general sense, these couplings are such that windrow chute 104, ramp 106, and/or assembly 108 may be directly attached to combine structure other than chassis 102 but are at least indirectly coupled with chassis 102 nonetheless. FIG. 2 schematically shows chassis 102, to which are coupled windrow chute 104, ramp 106, and assembly 108. FIGS. 2 and 3 show that ramp 106 can be attached directly to assembly 108 and/or to chassis 102.

Windrow chute 104 is attached to the rear of combine 100. Windrow chute 104 receives straw 110 which is thrown from the rear of combine 100 and over ramp 106 and assembly 108 (which, as shown in FIG. 3 is a spreader assembly 108). FIG. 3 shows straw 110 in two different places. Straw 110 is shown in FIG. 3 as having been thrown through the air and is thus shown as an arrow showing the direction of flow of straw 110. Straw 110 is also shown in FIG. 3 as a single line depending from a leading edge 112 of windrow chute 104. Straw 110 is received by leading edge 112 of chute 104, slides down chute 104, and is deposited on the ground in windrows. Leading edge 112 of windrow chute 104 is "leading" with reference to the flow of the material as shown by the arrow associated with straw 110 (the material being the straw 110), leading edge 112 (being a part of windrow chute 104) also being coupled with chassis 100, as indicated above. Leading edge 112 is thus configured for receiving a flow of the material 112 (i.e., the straw 112).

Ramp 106 can be attached to spreader assembly 108 and/or to chassis 102 and is located in the vicinity of windrow chute 104 and upstream of spreader assembly 8, as shown in FIG. 3. Ramp 106 receives chaff from the cleaning system of combine 100 and conveys the chaff down to spreader assembly 108.

Assembly 108 is also attached to the rear of combine 100, such as by way of the rear axle or the rear axle support. It is understood that assembly 108 can be attached to combine 100 in one or more other ways. For example, a horizontal spreader 108 can be hung from above and connected back into chassis 102. Assembly 108 includes a device 114 and at least one flexible wiper 116 which is coupled with device 114. As shown in FIGS. 2-6, assembly 108 can be a spreader assembly 108; spreader assembly 108 is provided only by way of example, and it is understood that other structure on combine 100 could be used to include flexible wiper 116. Thus, spreader assembly 108 includes device 114 and wiper 116. Spreader assembly 108 receives chaff from the cleaning system of combine 100 by way of ramp 106, and, as parts (for example, disks 118 and cones 122) of spreader assembly 108 rotate, spreader assembly 108 casts the chaff away from combine 100 and onto the ground.

Spreader assembly 108, in general, includes two rotating disks 118, a plurality of blades, bats, or paddles 120 attached to disks 118 (as used herein, the term "blades" with respect to spreader blades 120 is intended to encompass spreader blades, spreader bats, spreader paddles, or the like), a plurality of cones 114 attached to disks 118, and a plurality of wipers 116 coupled with cones 114. As the disks 118 rotate, blades 120 capture and cast the chaff away from combine 100. Arrow 124 shows the direction of rotation of disk 118 shown in the foreground of FIG. 3; the disk 118 shown in the background of FIG. 2 can rotate in an opposite direction (relative to the disk 118 in the foreground) in the embodiment shown in FIG. 3. A single cone 114 is attached to each disk 118, each cone 114 being substantially identical to one another. A respective cone 114 is the device 114 disclosed above (each cone 122 can alternatively be referred to as a spreader cone 122). Being fixedly attached to a respective disk 118, cone 114 rotates with disk 118. The device 114 (the cone 114) is thus configured for rotating and thereby for rotating the at least one flexible wiper 116 therewith, the at least one flexible wiper 116 thereby being configured for cleaning the material 110 (for example, the straw 110) from leading edge 112 of windrow chute 104.

As shown in FIGS. 3-6, cone 114 includes a side wall 126 and a top with a hole 128 formed therein. The side wall 126 of cone 114 can include two opposing depressions 130, each depression 130 including a through-hole 132. Hole 128 in the top of cone 114 is formed by a hollow column 134 extending vertically within cone 114, column 134 meeting a generally horizontally extending interior base 136 extending generally from one depression 130 to the other depression 130. Side wall 126 of cone 114, column 134, and interior base 136 can all be formed as a single unitary part or as discrete parts which are joined together. Hollow column 134 forms a passageway 138 therethrough. Further, interior base 136 includes a hole 140 therethrough which is substantially aligned with the passageway 138 of column 134. Cone 114 can be made, optionally, of polypropylene, aluminum, or other materials, and the features disclosed herein concerning cone 114 can optionally be machined or molded into cone. Cone 114 itself is a known structure and does not include cap assembly 142.

Spreader assembly 108 further includes two cap assemblies 142 attached respectively to the top of cones 114. Because each cap assembly 142 is substantially identical to one another, only one cap assembly 142 is described herein. Cap assembly 142 includes a shaft 144 (such as a hexagonal shaft 144), a threaded first bolt 146 and a corresponding nut 148, a cap 150, a plurality of wipers 116, and a threaded second bolt 152.

Figure 6:
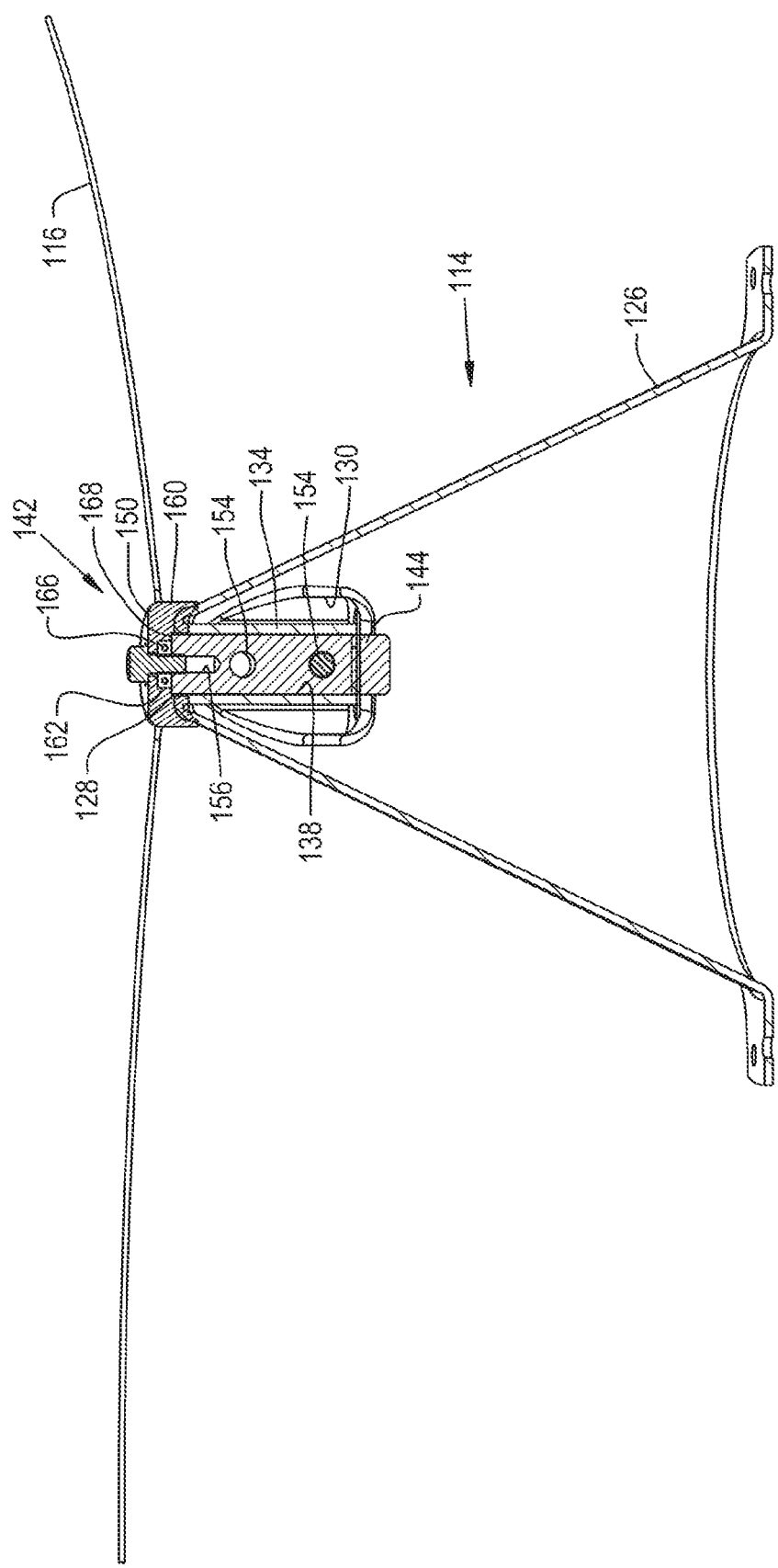
FIG. 6 is a cross-sectional view of the spreader cone and cap assembly taken along line 6-6 of FIG. 5.

Shaft 144 can have a hexagonally-shaped cross-section (this cross-sectional shape is not limiting, and it is understood that other cross-sectional shapes can be used for the shaft). Shaft 144 can have a longitudinal extent and have two transversely extending through-holes 154, either of which can receive first bolt 146 (FIGS. 6, 7, and 8 shows bottom through-hole 154 receiving first bolt 146). Shaft 144 also has a blind hole 156 at one end of shaft 144 and extending along the longitudinal axis of shaft 144. This blind hole 156 can be threaded (for example, rifle bored and tapped) and can thereby threadably receive threaded second bolt 152. Shaft 144 is inserted into the top of cone 114, more specifically, into passageway 138. Shaft 144 can extend through passageway 138 and also through hole 140 in interior base 136 of cone 114. Further, one of the transversely extending holes 154 in shaft 144 is aligned with holes 132 in depressions 130 during assembly. First bolt 146 is inserted through holes 132 in depressions 130 and through the aligned hole 154 in shaft 144, this hole 154 in shaft 144 in the drawings being shown as the bottom hole 154. Nut 148 can then be secured to bolt 146 in one of the depressions 130 so as to securely hold shaft 144 to cone 114. The cone 114 shown in the foreground in FIG. 3 shows first bolt 146 and nut 148 being offset from the corresponding hole 132; this is understood to be for illustrative purposes only, as bolt 146 in practice is positioned in hole 132 and nut 148 is secured to the end of bolt 146.

Figure 9:
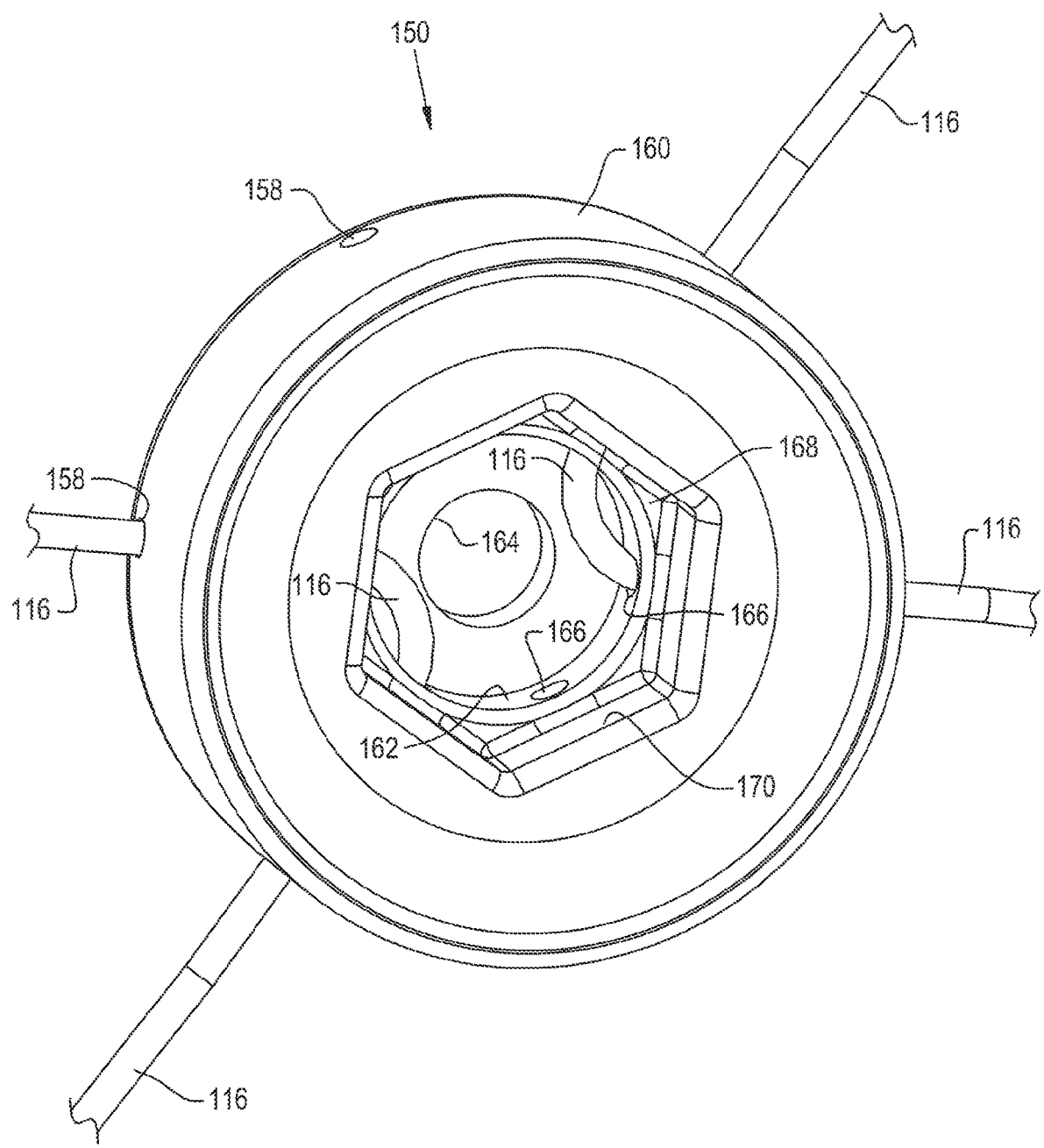
FIG. 9 is a bottom, perspective view of the cap of the cap assembly of FIG. 4.

Cap 150 is attached to the top of spreader cone 114 and includes a plurality of holes 158. More specifically, cap 150 includes a circumferential wall 160, an interior wall 162, and a through-hole 164. The circumferential wall 160 includes holes 158, which can be referred to as circumferential holes 158. The interior wall 162 also includes a plurality of interior holes 166 which align with circumferential holes 158 in circumferential wall 160. Cap 150 can be a solid body or a hollow body. After attaching wipers 116 to cap 150, cap 150 can be attached to the top of cone 114 by way of shaft 144 and second bolt 152. More specifically, cap 150 is placed over the top of cone 114 and over the top of shaft 144. The top of shaft 144 is thereby seated against a substantially horizontal wall 168 extending between substantially vertical interior wall 162 and a second substantially vertical wall 170 of cap 150, this second wall 170 being positioned vertically below and radially outwardly of interior wall 162, as shown in FIGS. 6 and 9. Second wall 170 can have a hexagonal shape, matching that of the hexagonal shape of shaft 144 (shaft 144 and second wall 170 can be designed to have other shapes as well). After seating cap 150 over the top of cone 114 and shaft 144, second bolt 152 is inserted through hole 164 of cap 150, this bolt 152 being threadably secured in blind hole 156 and being tightened to securely hold cap 150 (and thus wipers 116) to the rotatable cone 114. Cap 150 can be made of nylon and can be machined out of bar stock of nylon. Alternatively, other materials and other methods of forming cap 150 (such as molding) can be used; thus, this is provided by way of example and not by way of limitation.

One or more wipers 116 can be attached to cap 150. FIG. 9 shows that a plurality of wipers 116 are attached to cap 150. Thus, the at least one flexible wiper 116 can include a plurality of the flexible wiper 116. Each wiper 116 is generally formed as an elongate cord or string (other embodiments of the wiper of the present invention are possible, as disclosed below). Each wiper 116 can be attached to cap 150 in various ways. For instance, FIG. 9 shows that a single wiper 116 can be inserted into one circumferential hole 158 on cap 150 and extended through a corresponding interior hole 166 in the interior wall 162 of cap 150. Wiper 116 can then be bent or curved and then inserted back through an adjacent interior hole 166 in the interior wall 162 of cap 150 and then extended through cap 150 and through a corresponding circumferential hole 158 of cap 150. Another wiper 116 can be attached to cap 150 in a similar manner by inserting wiper 116 through other circumferential and interior holes 158, 166 of cap 150. Six such holes 158 (and corresponding holes 166) can be provided in cap 150; more or less holes can be used. Aligned holes 158 and 166 can be formed by a single corresponding channel extending between circumferential wall 160 and interior wall 162. The plurality of flexible wipers 116 extend respectively through the plurality of holes 158, 166. A wiper can extend through each of holes 158. Thus, zero to six wipers can be used, depending upon operating conditions (more or less wipers can be used, depending upon the number of holes 158). After cap 150 is secured to cone 114, wipers 116 are positioned adjacent interior wall 162 and above the top of shaft 144, as indicated in FIG. 6. Thus, the illustrated embodiment provides that wipers 116 are looped through holes 158, 166; in this way, wipers 116 are retained by cap 150. This looping of wipers 116 can be done manually or by an automated process. Alternatively, wipers can be pinched, tied, or knotted. To pinch wipers 116, wipers 116 can be pinched (or clamped) between cap 150 the top of shaft 144. Thus, the space between cap 150 and shaft 144 can be adjusted using bolt 152. To tie or knot wipers 116, a longitudinal end of a wiper 116 can be used to form a knot on itself, and then the other end of wiper 116 can be threaded through holes 158, 166 moving from interior wall 162 to circumferential wall 160. A cord can be used as wiper 116 (as shown in FIGS. 3-9). Such a wiper 116 can be made of, for example, nylon (this is provided by way of example and not by way of limitation). Alternatively, wiper 116 can be a braided cable, such as a braided steel cable. Alternatively, wiper 116 can be formed as a chain (with chain links), such as a metallic chain. Wiper 116 can be formed by molding, extruding, machining, or any other relevant process.

Figure 10:
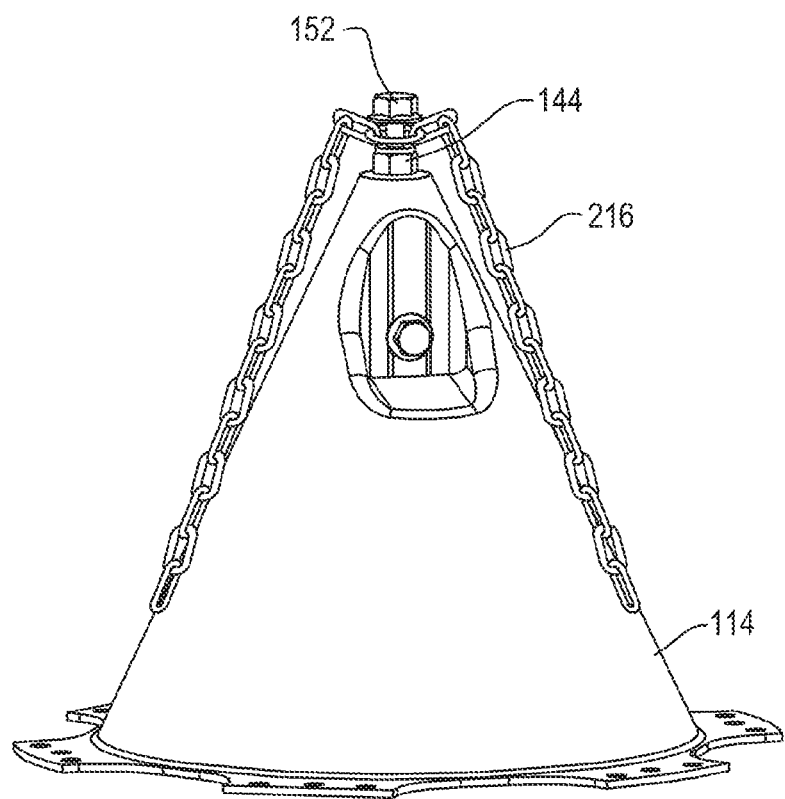
FIG. 10 is a perspective view of another embodiment of the present invention.

Alternatively, the wipers of the present invention can be formed as something other than a cord. For example (and this is provided merely by way of example and not by way of limitation), the wiper can be a chain, a cable, a fiberglass rod, a rubber string or a thin-piece of rubber, a zip-tie, or anything that is at least slightly flexible. A chain, for example, advantageously can wipe heavier material, such as material that is wet. For example, rather than inserting a wiper formed as a chain through holes 158 of cap 150, such a chain can optionally be mounted to the top of the cone (such as by way of a shaft, such as shaft 144), and cap 150 can thereby be omitted. In this way, the chain can be bolted to the top of the shaft. A centrally located link of the chain can be expanded, a bolt can be driven down through this chain link, and this bolt can be threadably secured to the top of the shaft. The chain can be approximately two feet in length, and approximately eight inches of chain can hang down on each side of the cone (these dimensions are provided merely by way of example and not by way of limitation). FIG. 10 shows an embodiment of the present invention using the chain. FIG. 10 shows cone 114, shaft 144, chain 216 (which serves as the wiper of the present invention), and bolt 152 extending down through a link of chain 216 and being threadably secured to shaft 144. As cone 114 rotates, the loose ends of chain can arise and perform the wiping function. Alternatively, the chain can be welded to a shaft, such as shaft 144. Alternatively, the chain (or another embodiment of the wiper) can be overmolded by the cap such that the cap can encapsulate a portion of the chain and thereby attach to the chain.

Regarding assembly, shaft 144 can first be inserted into hole 128 on the top of spreader cone 114 and secured to spreader cone 114 by way of bolt 146 and nut 148. After inserting wipers 116 in holes 158, 166 of cap 150 as disclosed above, cap 150 is mounted to the top of cone 114 and shaft 144. Shaft 144 seats on horizontal wall 168. Bolt 152 is inserted through hole 164 in cap 150 and into hole 156 in shaft 144 and thereby secures cap 150 to cone 114 and shaft 144.

In use, chaff flows down ramp 106 and to spreader assembly 108, spreader assembly 108 casting the chaff away from the rear of combine 100 and onto the ground. A cleaning system of the combine 100 throws straw over spreader assembly 108 to windrow chute 104. Windrow chute 104 then leads the straw 110 so as to lay the straw 110 on the ground in the form of windrows. However, straw 110 can fall short of windrow chute 104 and begin to clog the leading edge 112 of windrow chute 104, thereby rendering windrow chute 104 and/or spreader assembly 108 less effective or completely ineffective. Wipers 116 attached to the top of spreader cones 114 rotate with spreader cones 114. In so rotating, wipers 116 prevent, cut, wipe away, and/or remove the straw 110 which has fallen short of windrow chute 104 so that windrow chute 104 and spreader assembly 108 are effective for their purposes. Further, if wiper 116 is not to be used with cone 114, then cap 150 can be removed from cone 114 and shaft 144 can be removed and flipped 180° and reinstalled in passageway 138 of column 134. In so doing, bolt 146 can be reinserted through holes 132 but this time in the other transverse hole 154 in shaft 144 (this other hole 154 being the top hole 154 shown in FIGS. 6-8. After so reinstalling shaft 144, the top of shaft 144 will be substantially flush with the top of cone 114, thereby providing a way to close up passageway 138 when no cap 150 and no wiper 116 is to be used with cone 114.

The present invention further provides a method of using an agricultural machine 100, the method including the steps of: providing a base member 102, a leading edge 112 coupled with base member 102, and an assembly 108 coupled with the base member 102 and including a device 114 and at least one flexible wiper 116 coupled with the device 114; receiving, by the leading edge 112, a flow of a material 112; and rotating the device 114 and thereby rotating the at least one flexible wiper 116 therewith, the at least one flexible wiper 116 thereby cleaning the material from the leading edge 112. The agricultural machine 100 can be an agricultural harvester 100. The method can further include a windrow chute 104 coupled with the base member 102, the windrow chute 104 including the leading edge 112. The at least one flexible wiper 116 can include a plurality of the flexible wiper 116, the assembly 108 being a spreader assembly 108, the device 114 being a spreader cone 114, the spreader assembly 108 including a cap assembly 142 which is attached to the spreader cone 114 and which includes the plurality of flexible wipers 116. The cap assembly 142 can include a cap 150 which is attached to the spreader cone 114 and which includes a plurality of holes 158, 166, the plurality of flexible wipers 116 extending respectively through the plurality of holes 158, 166. Each of the plurality of flexible wipers 116 is an elongate cord.

In summary, the present invention thus provides a wiper 116 which runs past the front of chute 104 designed to catch residue, such as straw. One or more wipers 116, such as a cord, chain, or another embodiment of the wiper of the present invention, are added to the top of spreader cones 114 (or some other device) to wipe the front edge 112 of chute 104 (or any other stagnant edge). With the addition of an exposed leading edge (such as leading edge 112 of windrow chute 104) to, for example, a combine, a form of agitation must be added to the leading edge 112 to keep material from adding up. Wipers 116 provide this agitation. The addition of the cap assembly 142 (which can generally be referred to as a bracket) to the top of spreader cone 114 allows the addition of cord (forming wipers 116) to cones 114 (as disclosed herein, the wiper of the present invention can be in different forms). These cords 116 run along the leading edge 112 and thereby wipe material 110.

According to alternative embodiments of the present invention, wiper 116 could be formed as a part of device 114, such as (but not limited to) cone 114. Alternatively, wiper 116 could be used without a cone or spreader system. That is, wiper 116 can be attached to other structure besides spreader assembly 108 and can still perform a wiping action with respect to any leading edge. For example (this is provided by way of example and not by way of limitation), wiper 116 could be attached directly to a chute (such as, for example, windrow chute 104); that is, wiper 116 could have its own rotating device mounted directly on windrow chute 104, this rotating device being powered, for example, hydraulically or electrically. Explicitly stated, the present invention is not limited to, and does not necessarily include, a spreader assembly, cones, depressions on cones, caps (or any specific way of attaching caps to cones or attaching wipers to cones or caps), any number of holes in the cap, any particular cross-sectional shape of the shafts, or other structure described herein relative to spreader assembly 108. Further, the leading edge could be something other than the leading edge of a windrow chute; that is, the leading edge can be any stagnant edge which can collect material.

Further, the wiper of the present invention may be added or removed as necessary and may involve a quick detach mechanism. For example (this is not considered to be limiting), the cap described above can include one or more snap features so that the cap can be snapped onto the cone, or, alternatively, the cone can include one or more snap features so that the cone snaps to the spreader assembly (the cone including the wiper). Because the present invention is not limited to caps or cones, stated generally one or more wipers (whether by way of other structure or not) can be attached and detached to structure using any kind of quick detach design such that the attaching and detaching of the one or more wipers is toolless (that is, without needing to use tools).

Alternatively, wipers can be mounted in various ways. For example, hardware associated with the wipers can be mounted to the shaft 144 itself and not to the body of the cone (such as side wall 126 of cone 114). For example, a flat plate (having various shapes, such as circular, rectangular, square, or other shapes) can be mounted to the top end of shaft (and thus generally on top of the cone although not necessarily in contact with other portions of the cone) and extend outwardly therefrom. The plate can extend transversely relative to the shaft 144 and can be mounted to the shaft in any number of ways, including, but not limited to, bolting the plate to the shaft, welding the plate to the shaft, snap-fitting the plate to the shaft, or the like. Holes can be formed in the plate (such as on the longitudinal ends of a rectangular plate), and one or more wipers can be attached to each of these holes (such as by way of tying or knotting, although the present invention is not limited to such attachment ways). In an alternative embodiment, the wipers can be mounted to the cone without the shaft 144.

Further, it is understood that the cone can be formed without depressions 130, or, in use, depressions can be shielded from collecting material therein (such as with tape or any other shielding mechanism). Without such depressions, shaft 144 can be designed to extend down through the cone and to attach to other structure (such as to the disks) or to a base below. Alternatively, the shaft 144 can be molded to the plastic of the cone. Alternatively, the cone may be used without the shaft 144. As such, an insert may be molded to the cone, bolted to the cone, or otherwise attached thereto. Such an insert can threadably receive a bolt, such as bolt 152, to hold, for example, cap 150.

Figure 11:
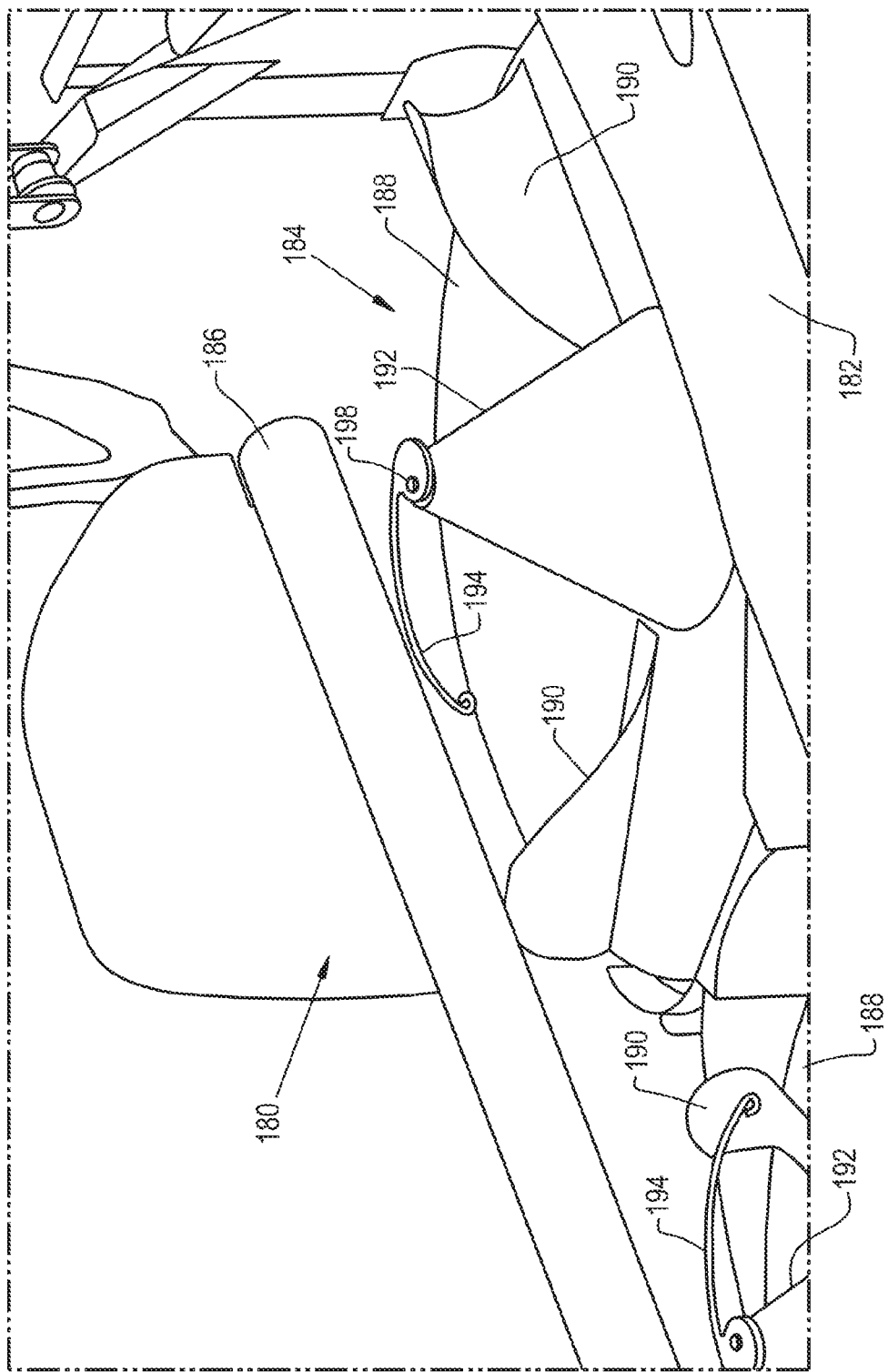
FIG. 11 is a perspective view of another embodiment of a windrow chute, a ramp, and a spreader assembly which can be attached to the rear of the agricultural machine of FIG. 1.

Referring now to FIG. 11, there is shown a perspective view of another embodiment of a windrow chute 180, a ramp 182 and a spreader assembly 184 which can be attached to the rear of the agricultural machine of FIG. 1. Similar to the windrow chute 104 shown in FIG. 3, the windrow chute 180 includes a leading edge 186 for receiving a flow of crop material (e.g., straw). Likewise, the spreader assembly 184 includes a pair of rotating disks 188 which each carry a plurality of blades 190. A cone 192 is concentrically mounted to each disk 188 and assists with directing the crop material toward the rotating disk 188 for spreading the crop material back to the field.

A wiper 194 in the form of a single curved wire (FIGS. 11 and 12) is positioned at the top of the cone 192 and rotates with the cone 192. The wiper 194 is shown with only a single curved wire, but can include a different number of curved wires, depending on the application. The curvature of the wire 194 defines a scooped configuration to assist with removal of crop material from the leading edge 186 of the windrow chute 180. The wire 194 has a proximal end which can be connected to the top end of the cone 192 in any suitable manner, such as by using a hexagonal opening 196 and fastener 198. The distal end of the wire 194 can include a bent portion 200 to assist with the removal of crop material and provide reinforcement at the distal end.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural machine, comprising:
   a base member;
   a windrow chute coupled with said base member, said windrow chute including a leading edge coupled with said base member and configured for receiving a flow of a material; and
   a spreader assembly coupled with said base member, said assembly including a device having a top end and a hole in the top end and a cap assembly, the cap assembly having a shaft inserted within the hole of the device, a cap attached to the shaft and covering the shaft and the device, and at least one flexible wiper coupled with the cap, said device being configured for rotating and thereby for rotating said at least one flexible wiper therewith, said at least one flexible wiper thereby being configured for cleaning said material from said leading edge.

2. The agricultural machine of claim 1, wherein the agricultural machine is an agricultural harvester.

3. The agricultural machine of claim 1, wherein said at least one flexible wiper includes a plurality of said flexible wiper, said device being a spreader cone, the cap assembly is attached to said spreader cone.

4. The agricultural machine of claim 3, wherein said cap is attached to said spreader cone and includes a plurality of holes, said plurality of flexible wipers extending respectively through said plurality of holes.

5. The agricultural machine of claim 4, wherein each of said plurality of flexible wipers is an elongate cord.

6. A spreader assembly for an agricultural machine including a leading edge configured for receiving a flow of a material, said assembly comprising:
    a device having a top end and a hole in the top end; and
    a cap assembly having a shaft inserted within the hole of the device, a cap attached to the shaft and covering the shaft and the device, and at least one flexible wiper coupled with the cap, said device being configured for rotating and thereby for rotating said at least one flexible wiper therewith, said at least one flexible wiper thereby being configured for cleaning the material from the leading edge.

7. The assembly of claim 6, wherein said at least one flexible wiper includes a plurality of said flexible wiper, said device being a spreader cone of said spreader assembly, said cap assembly is attached to said spreader cone.

8. The assembly of claim 7, wherein said cap is attached to said spreader cone and includes a plurality of holes, said plurality of flexible wipers extending respectively through said plurality of holes.

9. The assembly of claim 8, wherein each of said plurality of flexible wipers is an elongate cord.

10. A method of using an agricultural machine, said method comprising the steps of:
    providing a base member, a windrow chute coupled with said base member, said windrow chute including a leading edge coupled with said base member, and a spreader assembly coupled with said base member and including a device having a top end and a hole in the top end and a cap assembly, the cap assembly having a shaft inserted within the hole of the device, a cap attached to the shaft and covering the shaft and the device, and at least one flexible wiper coupled with the cap;
    receiving, by said leading edge, a flow of a material; and
    rotating said device and thereby rotating said at least one flexible wiper therewith, said at least one flexible wiper thereby cleaning said material from said leading edge.

11. The method of claim 10, wherein the agricultural machine is an agricultural harvester.

12. The method of claim 10, wherein said at least one flexible wiper includes a plurality of said flexible wiper, said device being a spreader cone, said cap assembly is attached to said spreader cone.

13. The method of claim 12, wherein said cap is attached to said spreader cone and includes a plurality of holes, said plurality of flexible wipers extending respectively through said plurality of holes.

14. The method of claim 13, wherein each of said plurality of flexible wipers is an elongate cord.

* * * * *